Figure 1:
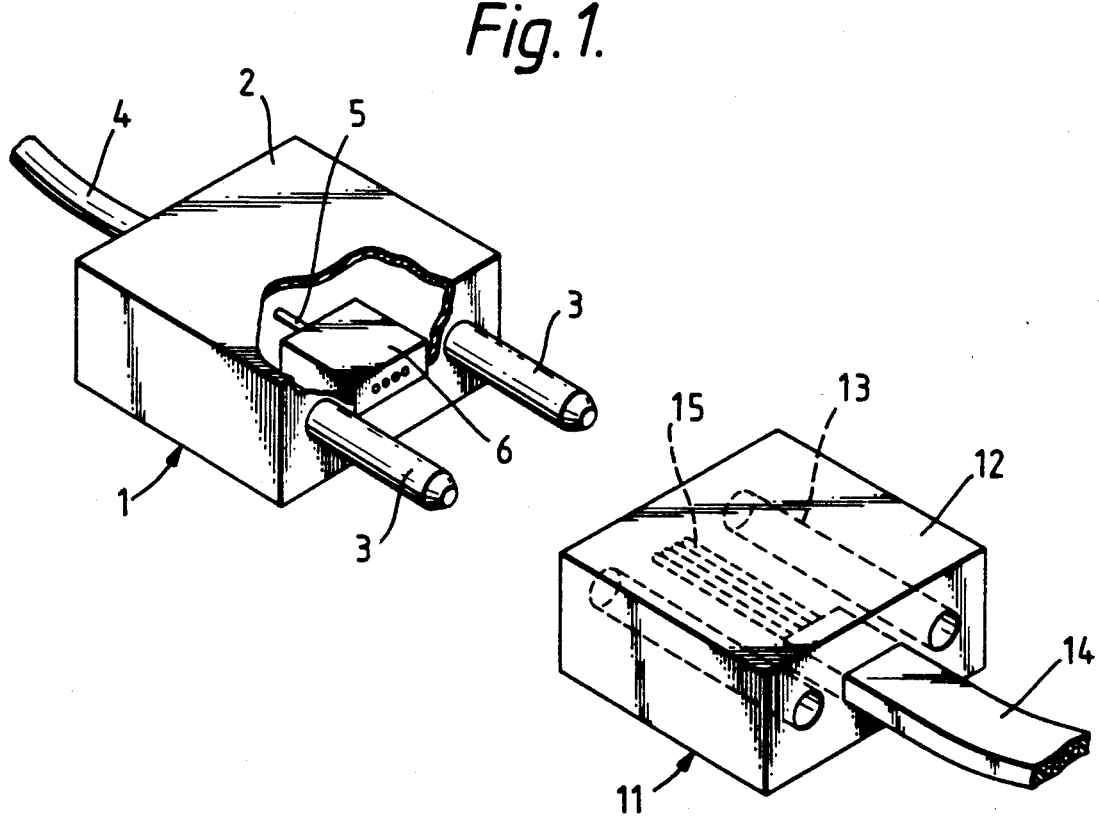

United States Patent [19]

Longhurst

[11] Patent Number: 5,199,093
[45] Date of Patent: Mar. 30, 1993

[54] MULTI-PART OPTICAL FIBRE CONNECTORS

[75] Inventor: Philip C. Longhurst, Bunbury, England

[73] Assignee: Bicc plc., United Kingdom

[21] Appl. No.: 863,496

[22] Filed: Mar. 30, 1992

Related U.S. Application Data

[63] Continuation of Ser. No. 700,477, May 15, 1991, abandoned.

[30] Foreign Application Priority Data

May 22, 1990 [GB] United Kingdom ............. 9011424

[51] Int. Cl.⁵ .................................................. G02B 6/36
[52] U.S. Cl. ....................................... 385/88; 385/14; 385/49; 385/89
[58] Field of Search ............... 350/96.11, 96.17, 96.20, 350/96.21, 96.22; 385/14, 53, 88, 89, 92-94, 49, 55, 56, 60, 61, 77, 78, 79

[56] References Cited

U.S. PATENT DOCUMENTS

| | | | |
|---|---|---|---|
| 4,167,303 | 9/1979 | Bowen et al. | 350/96.21 |
| 4,173,389 | 11/1979 | Curtis | 350/96.20 |
| 4,427,879 | 1/1984 | Becher et al. | 350/96.20 X |
| 4,611,886 | 9/1986 | Cline et al. | 350/96.20 |
| 4,650,278 | 3/1987 | Maciejko et al. | 385/73 |
| 4,762,388 | 8/1988 | Tanaka et al. | 350/96.20 |
| 4,840,451 | 6/1989 | Sampson et al. | 350/96.20 |
| 4,902,092 | 2/1990 | Grandy | 385/56 |
| 4,993,803 | 2/1991 | Suverison et al. | 350/96.20 |
| 5,076,654 | 12/1991 | Presby | 385/14 X |

FOREIGN PATENT DOCUMENTS

| | | |
|---|---|---|
| 0216211 | 4/1987 | European Pat. Off. |
| 0277390 | 8/1988 | European Pat. Off. |
| 60-200210 | 3/1984 | Japan |

Primary Examiner—Akm E. Ullah
Attorney, Agent, or Firm—Anthony J. Casélla; Gerald E. Hespos

[57] ABSTRACT

An optical fibre connector-part comprises a body of moulded plastics material having two oppositely disposed ends, at least one of which ends is adapted to make a plug and socket connection with an end of another optical fibre connector-part. At least one optical conductor is disposed within and extends between the two oppositely disposed ends of the plastics body and has permanently optically connected therein at least one discrete passive integrated optical chip for effecting at least one passive fibre optic function. At least one permanent optical connection between the optical conductor and the optical chip is wholly encapsulated within the moulded plastics material of the body so that an optical signal is accurately transmittable between the optical conductor and the optical chip.

11 Claims, 2 Drawing Sheets

5,199,093

MULTI-PART OPTICAL FIBRE CONNECTORS

This invention relates to multi-part optical fibre connectors for detachably optically inter-connecting end-to-end at least two flexible optical guides each comprising at least one optical fibre. Such multi-part optical fibre connectors essentially comprise two separately formed connector-parts, each of which is adapted to be permanently or detachably secured to one of the flexible optical guides to be optically inter-connected, and may include at least one separately formed intermediate connector-part or adaptor for optically inter-connecting two separately formed connector parts. To facilitate detachable inter-connection of two separately formed optical fibre connector-parts, each connector part of a multi-part optical fibre connector constitutes at one or each of two oppositely disposed ends of the connector-part a plug or a socket adapted to effect a detachable plug and socket connection with a socket or a plug at an end of another connector-part. Multi-part optical fibre connectors of this kind are widely used in optical transmission systems.

It is a object of the present invention to provide, for use in a multi-part optical fibre connector of the aforesaid kind, an improved optical fibre connector-part which is of such a construction that an optical transmission system in which a multi-part optical fibre connector is inter-connected can be readily reconfigured or modified.

According to the invention, the improved optical fibre connector-part comprises a body of moulded plastics material having two oppositely disposed ends, at least one of which ends is adapted to make a plug and socket connection with an end of another optical fibre connector-part; and at least one optical conductor which is disposed within and extends between said two oppositely disposed ends of the body and which has permanently optically connected therein at least one discrete passive integrated optical chip for effecting at least one passive fibre optic function, at least one permanent optical connection between the optical conductor and said optical chip being wholly encapsulated within the moulded plastics material of the body so that an optical signal is accurately transmittable between the optical conductor and said optical chip.

Preferably, the discrete passive integrated optical chip or at least one of the discrete passive integrated optical chips of the improved optical fibre connector-part is so encapsulated in the plastics material of the housing that the chip is intermediate of the oppositely disposed ends of the body and is permanently optically inter-connected between end parts of the optical conductor or of at least one of the optical conductors, the permanent optical connections between said end parts of said optical conductor an the chip being wholly encapsulated within the moulded plastics material of the body.

In some circumstances, the discrete passive integrated optical chip or at least one of the discrete passive integrated optical chips of the improved optical fibre connector-part may be so encapsulated in the plastics material of the body that one side face of the chip is exposed at an end of the body constituting a plug or socket and the chip is permanently optically connected to a part of the optical conductor or of at least one of the optical conductors extending to the other end of the body, the permanent optical connection between said part of said optical conductor and the chip being wholly encapsulated within the moulded plastics material of the body.

In all cases, preferably the part or parts of the or each optical conductor of the improved optical fibre connector-part not constituted by the or a discrete passive integrated optical chip is or are at least one optical fibre.

The or each discrete passive integrated optical chip may be designed to effect any one of a plurality of fibre-optic functions included among which are:
(i) a tree coupler constituting a cascaded series of Y-junctions;
(ii) a star coupler incorporating a mixing region intermediate of a plurality of input points and a plurality of output points;
(iii) a wavelength division multiplexer;
(iv) a full-duplex wavelength division multiplexer;
(v) an attenuating device;
(vi) an optical filter;
(vii) a phase modulator;
(viii) an access coupler, and
(ix) an optical Wheatstone bridge.

This list of functions which the or a discrete passive integrated optical chip of the improved optical fibre connector-part can serve is, by no means exhaustive.

The or each discrete passive integrated optical chip of the improved optical fibre connector-part may be a suitable discrete passive integrated optical chip obtained from any source.

Where the improved optical fibre connector-part is to constitute one end part of a multi-part optical fibre connector, preferably one of the two oppositely disposed ends of the body of the improved optical fibre connector-part constitutes a plug or a socket and the other of the two oppositely disposed ends is adapted to be permanently or detachably secured to an end of at least one flexible optical guide comprising at least one optical fibre in such a way that the or each optical fibre of the guide is optically connected to the or an optical conductor of the improved optical fibre connector-part or that the or each optical fibre of the guide extends into the body of the improved optical fibre connector-part and constitutes a part of the or an optical conductor of the connector-part. The end of the body constituting a plug or a socket may also constitute at least one additional plug or socket for effecting a plug and socket connection with a socket or plug at an end of a further optical fibre connector-part.

The or each flexible optical guide to which one end of an improved optical fibre connector-end part can be permanently or detachably secured may be an optical cable comprising a single optical fibre or comprising a plurality of optical fibres or it may be an optical fibre ribbon comprising a plurality of optical fibres arranged side-by-side with their axes lying in a substantially common plane.

Where the improved optical fibre connector-part is to constitute an intermediate part of a multi-part optical fibre connector, for example an adaptor for inter-connecting by plug and socket connections two end parts of a multi-part optical fibre connector, each of two oppositely disposed ends of the body of said intermediate improved optical fibre connector-part will constitute a plug or a socket. The body of the intermediate improved optical fibre connector-part may constitute at least one additional plug or socket for effecting a plug and socket connection with a socket or plug at an end of a further optical fibre connector-part. The additional plug or socket or at least one of the additional plugs or sockets of the intermediate improved optical fibre connector-part may be disposed at one of the two oppositely disposed ends of the body of the connector-part or at a position intermediate of said two oppositely disposed ends.

It will be appreciated that the number of additional plugs or sockets constituted by the body of the improved optical fibre connector-part will be determined by the function of the or each discrete passive integrated optical chip wholly encapsulated within the moulded plastics material of the body of the connector-part.

The invention also includes an improved multi-part optical fibre connector for detachably inter-connecting end-to-end at least two flexible optical guides each comprising at least one optical fibre, at least one of the connector-parts of the multi-part optical fibre connector being an improved optical fibre connector-part substantially as hereinbefore described.

The invention further includes a kit of parts for assembling an improved multi-part optical fibre connector as hereinbefore described, which kit of parts comprises at least two optical fibre connector-end parts each comprising a housing which at one of two oppositely disposed ends of the housing constitutes a plug or a socket and which at the other of said two oppositely disposed ends is adapted to be permanently or detachably secured to an end of at least one flexible optical guide comprising at least one optical fibre and at least one optical conductor disposed within and extending between said two oppositely disposed ends of the housing; and at least two adaptors for optically inter-connecting two end parts, each adaptor comprising a body of moulded plastics material having two oppositely disposed ends, each of which ends is adapted to make a plug and socket connection with an end part, at least one optical conductor which is disposed within and extends between said two oppositely disposed ends of the body and which has permanently optically connected therein at least one discrete passive integrated optical chip for performing at least one passive fibre optic function, at least one permanent optical connection between the optical conductor and said optical chip being wholly encapsulated within the moulded plastics material of the body so that an optical signal is accurately transmittable between the optical conductor and said optical chip, the discrete passive integrated optical chip of each adaptor differing from the discrete passive integrated optical chip of the other adaptor or of each of the other adaptors.

At least one of the optical fibre connector-end parts of the kit of parts may have as its housing a body of moulded plastic material and may have permanently optically connected in its optical conductor at least one discrete passive integrated optical chip for performing at least one passive fibre optic function, at least one permanent optical connection between said optical conductor and said optical chip being wholly encapsulated within the moulded plastics material of the body constituting the housing of said connector-end part.

The improved optical fibre connector-part and the improved optical fibre connector of the present invention have the important advantage that an optical transmission system of any desired configuration can be readily assembled using one or more than one improved optical fibre connector-part incorporating at least one discrete passive integrated optical chip designed to effect a designed passive fibre optic function and that an existing optical transmission system can be readily reconfigured or modified by replacing one or more than one improved optical fibre connector-part inter-connected in the system with one or more than one improved, optical fibre connector-part of which the or each discrete passive integrated optical chip is designed to effect a function differing from the function of the chip or chips of the connector-part being replaced.

Figure 2:
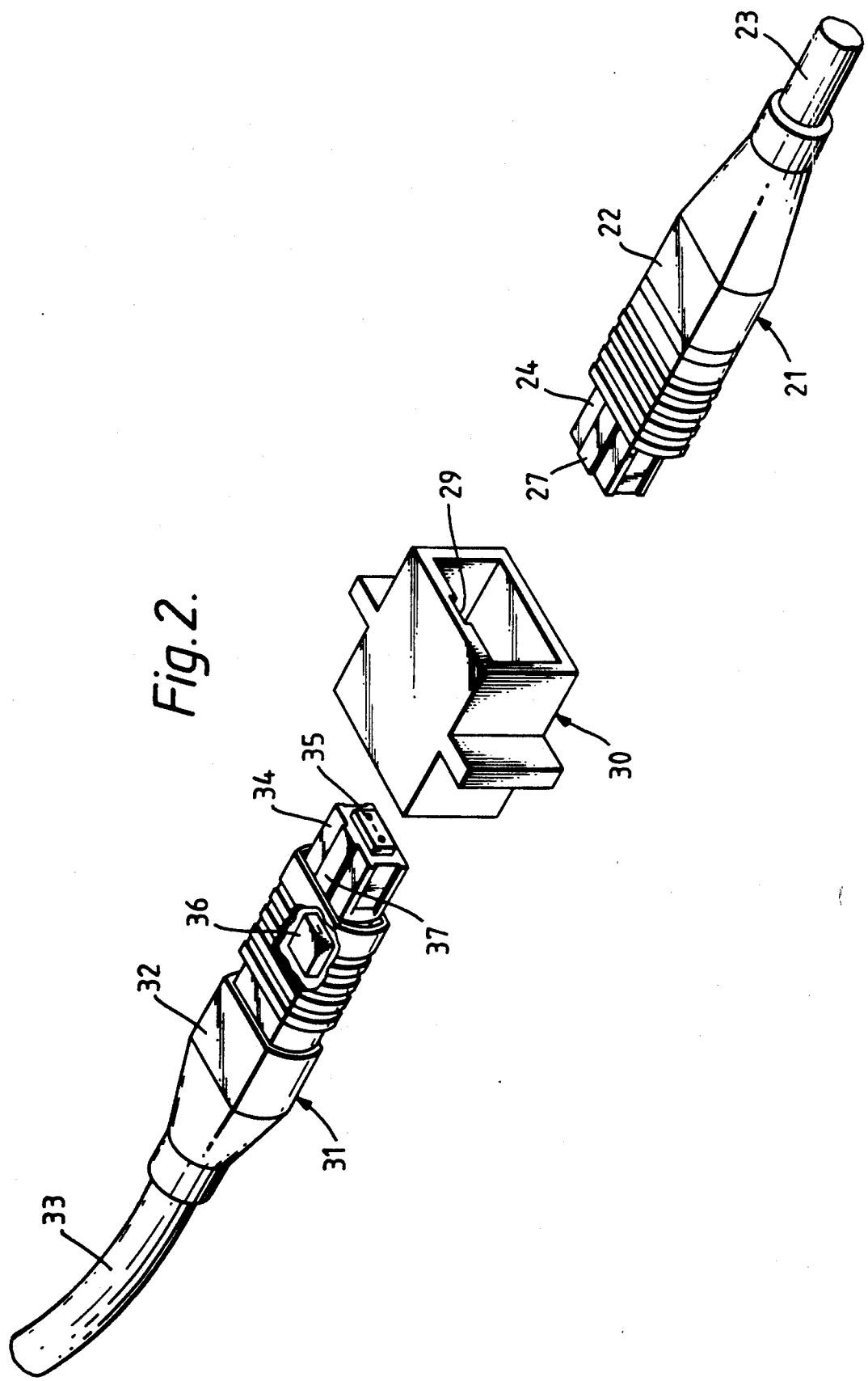

The invention is further illustrated by a description, by way of example, of two, preferred forms of multi-part optical fibre connector with reference to the accompanying diagrammatic drawings, in which:

FIG. 1 is an exploded diagrammatic representation of a preferred two-part optical fibre connector, FIG. 2 is an exploded representation of one preferred form of three-part optical fibre connector.

Referring to FIG. 1, the preferred two-part optical fibre connector comprises an optical fibre connector-part 1 having protruding from one of two oppositely disposed ends of its moulded plastics body 2 a pair of transversely spaced parallel rigid pins 3 adapted to effect plug and socket connections in a pair of transversely spaced parallel holes 13 in one of two oppositely disposed ends of the moulded plastics body 12 of an optical fibre connector-part 11. Encapsulated in one of the two oppositely disposed ends of the moulded body 12 of the optical fibre connector-part 11 is an end of an optical fibre ribbon cable 14 from which protrude four optical fibres 15 which are centrally disposed between the transversely spaced holes 13 and which extend to the other of the oppositely disposed ends of the body with their axes lying in the same plane as the axes of the holes. Encapsulated in one of the two oppositely disposed ends of the moulded body 2 of the optical fibre connector-part 1 is an end of an optical cable 4 having a single optical fibre 5 and extending between the encapsulated end of the optical cable and the other of the oppositely disposed ends of the body is an optical conductor constituted in part by the optical fibre of the optical cable and in part by a discrete passive integrated optical chip 6 which is optically connected to the optical fibre and which is so encapsulated in the plastics material of the body 2 that one side face of the chip is exposed and centrally disposed between the transversely spaced rigid pins 3. The discrete passive integrated optical chip 6 functions as a tree coupler constituting a cascaded series of Y-junctions and in the exposed side face of the chip are exposed the end faces of four optical guides whose axes lie in the same plane as the axes of the rigid pins and which are so transversely spaced apart that, when a plug and socket connection is made between the optical fibre connector-parts 1 and 11, the end faces of the optical guides and the end faces of the optical fibres 15 abut to effect optical connections therebetween.

The first preferred form of three-part optical fibre connector shown in FIG. 2 comprises an optical fibre connector-part 21, an optical fibre connector-part 31 and, adapted to optically interconnect the two optical fibre connector-end parts, a mating adaptor 30. The optical fibre connector-end part 21 comprises a moulded plastics body 22 in one of two oppositely disposed ends of which is encapsulated an end of a multi-fibre optical cable 23, the other end 24 of the moulded body constituting a plug. Encapsulated in the plug 24 of the optical fibre connector-end part 21 is a moulded array connector in an exposed end face of which are exposed the end faces of a plurality of optical fibres optically connected to the optical fibres of the optical cable 23. The axes of the exposed end faces of the optical fibres of the moulded array connector lie in a substantially common plane. The optical fibre connector-end part 31 comprises a moulded plastics body 32 having encapsulated in one of two oppositely disposed ends an end of an optical cable 33, the other of the oppositely disposed ends of the body constituting a plug 34. A moulded array connector 35 is so encapsulated in the plug 34 of the optical fibre connector-end part 31 that one end face of the moulded array connector is exposed. Extending between the optical fibres of the optical cable 33 and the encapsulated moulded array connector 35 are a plurality of optical conductors constituted in part by optical fibres and in part by a discrete passive integrated optical chip 36 encapsulated in the moulded body 32 intermediate of its ends and permanently optically connected between the optical fibres constituting the optical conductors. The discrete passive integrated optical chip 36 functions as a star coupler incorporating a mixing region intermediate of a plurality of input points and a plurality of output points. The end faces of the optical fibres extending from the integrated optical chip 36 are exposed at the end face of the moulded array connector 35 with their axes lying in a substantially common plane. The plugs 24 and 34 at the ends of the optical fibre connector-end parts 21 and 31 are adapted to effect plug and socket connections in sockets at the opposite ends of the mating adaptor 30. To this end, each of the plugs 24, 34 has a rib 27, 37 adapted to engage in a groove 29 in the mating adaptor 30, the arrangement being such that when the plugs 24, 34 are fully engaged in the mating adaptor the exposed end faces of the moulded array connectors 25, 35 abut with the exposed end faces of the optical fibres in axial alignment.

What I claim as my invention is:

1. For use in a multi-part optical fibre connector, an optical fibre connector-part comprising a body of moulded plastics material having two oppositely disposed ends, at least one of which ends is adapted to make a plug and socket connection with an end of another optical fibre connector-part; and at least one optical conductor which is disposed within and extends between said two oppositely disposed ends of the body and which has permanently optically connected therein at least one discrete passive integrated optical chip for effecting at lest one passive fibre optic function, at least one permanent optical connection between the optical conductor and said optical chip being wholly encapsulated within the moulded plastics material of the body so that an optical signal is accurately transmittable between the optical conductor and said optical chip.

2. An optical fibre connector-part as claimed in claim 1, wherein the discrete passive integrated optical chip is so disposed within the body that the chip is intermediate of the opposite disposed ends of the body and is permanently optically inter-connected between end parts of said optical conductor, the permanent optical connection between said end parts of said optical conductor and the chip being wholly encapsulated within the moulded plastics material of the body.

3. An optical fibre connector-part as claimed in claim 1, wherein the discrete passive integrated optical chip is so disposed within the body that one side face of the chip is exposed at said end of the body adapted to make a plug and socket connection and is permanently optically connected to a part of the optical conductor extending to the other end of the body, the permanent optical connection between said part of said optical conductor and the chip being wholly encapsulated within the moulded plastics material of the body.

4. An optical fibre connector-part as claimed in claim 2, wherein the part of the optical conductor not constituted by the discrete passive integrated optical chip is at least one optical fibre.

5. An optical fibre connector-part as claimed in claim 1, which is to constitute one end part of a multi-part optical fibre connector, wherein one of the two oppositely disposed ends of the body is adapted to make a plug and socket connection and the other of the two oppositely disposed ends is adapted to be secured to an end of at least one flexible optical guide comprising at least one optical fibre in such a way that the optical fibre of the guide is optically connected to the optical conductor of the optical fibre connector-part.

6. An optical fibre connector-part as claimed in claim 1, which is to constitute one end part of a multi-part optical fibre connector, wherein one of the two oppositely disposed ends of the body is adapted to make a plug and socket connection and the other of the two oppositely disposed ends is adapted to be secured to an end of an optical fibre ribbon comprising a plurality of optical fibres arranged side-by-side with their axes lying in a substantially common plane, in such a way that each optical fibre is optically connected to an optical conductor of the optical fibre connector part.

7. An optical fibre connector-part as claimed in claim 1, which is to constitute and intermediate part of a multi-part optical fibre connector, wherein each of two oppositely disposed ends of the body of the optical fibre connector-part is adapted to make a plug and socket connection with an end of another optical fibre connector-part.

8. An optical fibre connector-part as claimed in claim 1, wherein the passive integrated optical chip is selected from the group consisting of: a tree coupler constituting a cascaded series of Y-junctions, a star coupler incorporating a mixing region intermediate of a plurality of input points and a plurality of output points, a wavelength division multiplexer, a full-duplex wavelength division multiplexer, an attenuating device, an optical filter, a phase modulator, an access coupler and an optical Wheatstone bridge.

9. An optical fibre connector-part as claimed in claim 1, which optical fibre connector-part is one of the connector-parts of a multi-part optical fibre connector for detachably inter-connecting end-to-end at least two flexible optical guides each comprising at least one optical fibre.

10. A kit of parts for assembling a multi-part optical fibre connector, which kit of parts comprises at least two optical fibre connector end parts each comprising a housing having two oppositely disposed ends, one of which ends is adapted to make a plug and socket connection with an end of another optical fibre connector part and the other of which ends is adapted to be secured to an end of at least one flexible optical guide comprising at least one optical fibre, and at least one optical conductor disposed within and extending between said two oppositely disposed ends of the housing of the end part; and at least two adaptors for optically inter-connecting two end parts, each adaptor comprising a body of moulded plastics material having two oppositely disposed ends, each of which ends is adapted to make a plug and socket connection with an end part, at least one optical conductor which is disposed within and extends between said two oppositely disposed ends of the body and which has permanently optically connected therein at least one discrete passive integrated optical chip for performing at least one passive fibre optic function, at least one permanent optical connection between the optical conductor and said optical chip being wholly encapsulated within the moulded plastics material of the body so that an optical signal is accurately transmittable between the optical conductor and said optical chip, the discrete passive integrated optical chip of each adaptor differing from the discrete passive integrated optical chip of the other adaptor or of each of the other adaptors.

11. A kit of parts as claimed in claim 10, wherein at least one of the optical fibre connector-end parts has as its housing a body of moulded plastics material and has permanently optically connected in its optical conductor at least one discrete passive integrated optical chip for performing at least one passive fibre optical function, at least one permanent optical connection between said optical conductor and said optical chip being wholly encapsulated within the moulded plastics material of the body constituting the housing of said connector-end part.

* * * * *